United States Patent

[11] 3,544,718

[72] Inventor Robert Adler
Northfield, Illinois

[21] Appl. No. 682,455
[22] Filed Nov. 13, 1967
[45] Patented Dec. 1, 1970
[73] Assignee Zenith Radio Corporation
Chicago, Illinois
a corporation of Delaware

[54] VIDEO PLAYBACK SYSTEMS
14 Claims, 10 Drawing Figs.

[52] U.S. Cl. .......... 178/69.5, 178/6.7
[51] Int. Cl. .......... H04n 5/04
[50] Field of Search .......... 178/6.7(A), 69.5, 7.2; 179/100.3(A)

[56] References Cited

UNITED STATES PATENTS 2,851,521 9/1958 Clapp .......... 179/100.3(A)UX
3,267,212 8/1966 Goldmark et al. .......... 179/100.3(A)UX
3,383,460 5/1968 Pritchard .......... 178/5.4(BPD)UX

*Primary Examiner*—Richard Murray
*Attorney*—Francis W. Crotty

ABSTRACT: A video-playback system utilizes a vertically moving strip on which has been recorded a succession of horizontal lines each representing a scansion of video information. The system includes a collimated beam of coherent optical radiation which is focused upon the strip. A deflector causes repetitive horizontal deflection of the beam. A detector responds to a portion of the radiation either reflected from or transmitted through the strip and develops a control signal that has a component proportional to an effect, of information recorded on the strip, upon the radiation. Another developed signal is indicative of the movement of the beam during the deflection action. The control signal and that other signal are compared in order to develop an error signal which is proportional in turn to differences between those two signals. Finally, control means responds to the error signal and effects control of the action of the deflection means relative to the movement of the strip. As disclosed, the foregoing constitutes synchronizing and scanwidth control apparatus in an overall system in which, to effect recording upon the strip, the light beam is modulated in response to video picture information, deflected in response to video synchronizing signals and imaged upon the strip to effect recording of a succession of horizontal lines. On playback of the information recorded on the strip, the detector yields video picture and synchronizing signals which are fed to a video reproducer such as a television receiver.

INVENTOR.
Robert Adler
BY Francis W. Crotty
Attorney

INVENTOR.
Robert Adler
BY Francis W. Crotty
Attorney

INVENTOR.
Robert Adler
BY Francis W. Crotty
Attorney

VIDEO PLAYBACK SYSTEMS

BACKGROUND OF THE INVENTION

The present invention pertains to video-playback systems. More particularly, it relates to a system for synchronizing movement of a record-bearing strip with the scansion of a beam of light focused upon that strip.

While typical present-day video recording and playback systems utilize magnetic tape as a storage element, of interest by way of improvement over such magnetic tape approaches is the video recording and playback system disclosed and claimed in the copending U.S. Pat. application Ser. No. 658,447, filed Aug. 4, 1967, of Adrianus Korpel, assigned to the same assignee as the present application. In the Korpel system, the recording medium is a strip of material such as photographic film. For recording, the strip is caused to move vertically while a light beam modulated with video information is repetitively deflected so that a series of horizontal lines bearing the video information are recorded on the film. During subsequent playback, the same or a similar light beam, but unmodulated, is similarly caused to scan the film so as to trace out a like succession of horizontal lines. A detector responds to the light impinging upon the film as modified by the recorded information and yields a signal which may include both picture and synchronizing information. That signal is fed to a video reproducer in the form of a generally conventional television receiver. The Korpel system is especially attractive because the image recorded upon the film may be extremely small is size, enabling the recording of comparatively lengthy programs upon a contrastingly short length of the film. The Korpel system also is capable of faithful reproduction with a commendably high degree of image resolution.

It is essential for best performance that a correct relationship be maintained between the horizontal scanning action and the vertical motion of the strip or film. Unless the film speed is properly correlated with the rate of horizontal scan during playback, the scanning beam may travel alternatively along and between the recorded lines with a resultant production of slow visual beats which can be disturbing to the viewer. Additionally, when the recorded vertical synchronization pulse that controls the vertical scan in the reproducer is picked up from the film, the ratio between horizontal and vertical scanning rates may not be correct, as a result of which conventional line interlace is rendered improper and the lines appear to crawl on the image reproducer. Where the system is to enable maximum resolution, it is additionally required that the scanning beam always "ride" along the center of each recorded line. Further to the aim of achieving a maximum degree of performance on reproduction, it is also highly desirable that the lines defined by the scanning beam on playback be of correct length, that is, that the scanned raster be of the correct horizontal width.

It is, therefore, a general object of the present invention to provide a new and improved synchronization system which achieves, in apparatus of the foregoing character, the degree of performance indicated above as being desirable and necessary.

Another object of the present invention is to provide a new and improved system for use with such apparatus that enables direct recording and playback of a conventional color television video signal.

A particular object of the present invention is to provide a system for assuring the maintenance of a correct relationship between the horizontal scan of the light beam and the vertical film motion.

A further object of the present invention is to provide new and improved apparatus of the foregoing character which insures that the scanning beam on playback is always alined with the center of each recorded line.

It is a specific object of the present invention to provide a synchronizing system for such apparatus which maintains accurate alinement between the phase of the recorded lines passing a reference point and the horizontal scan.

Still another specific object of the present invention is to achieve synchronization between the horizontal scanning motion of the beam and the vertical film motion by utilizing information associated with the film in order to tie those two motions properly together.

Yet another object of the present invention is to provide such apparatus in which phase information is obtained directly from the lines recorded upon the film.

A still further object of the present invention is to provide a system for such apparatus which enables accurate control of the width of the scanned portion of the film during playback.

A related object of the present invention is to enable the recording and reproduction of a conventional color television picture without a shift in color in certain regions of the picture.

A still additional object of the present invention is to provide a synchronization system for such apparatus which enables accurate and faithful reproduction even though temperature changes or mechanical stresses alter the dimensions of the film strip.

Yet a further object of the present invention is to control the vertical film speed in such a system so that the number of horizontal scans per field on playback is the same as that occurring during recording.

SUMMARY OF THE INVENTION

A video-playback system in accordance with the present invention includes apparatus in which a strip moving vertically has recorded thereon a succession of radiation-responding horizontal lines each representing a horizontal scansion of video information. The system also includes means for developing a collimated beam of coherent optical radiation together with a deflector arrangement having means for developing a deflection signal and responsive thereto for effecting repetitive horizontal deflection of the beam at a rate proportional to the frequency of the deflection signal, and means for focusing the beam upon the strip. Disposed to receive a portion of the radiation reduced from the strip is a detector which develops a control signal having a frequency proportional to that of field synchronizing signals also recorded along with the video information on the strip. A comparison signal is derived from the deflection signal and has a predetermined nominal frequency relation to the control signal. There are means for comparing the control signal with the comparison signal to develop an error signal. Finally, the system includes means responsive to the error signal for controlling the action of the deflection means relative to the movement of the strip.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

DESCRIPTION OF PREFERRED EMBODIMENTS

Figure 1:
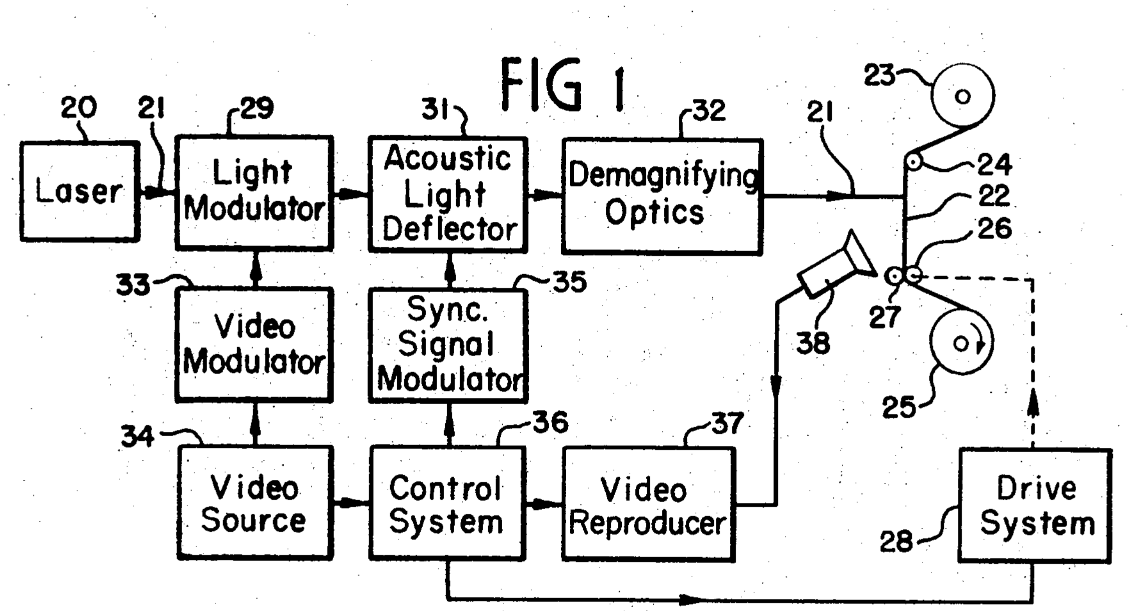
FIG. 1 is a schematic block diagram view of a video recording and playback system.

The system illustrated in FIG. 1 is constructed basically in accordance with the principles outlines in the aforementioned Korpel application. It includes a source of collimated, high-intensity optical radiation as exemplified by that from a laser. The term "optical" is used here to denote that type of radiation which is capable of being acted upon, e.g. focused, by typical optical components such as lenses; included is radiation in the infrared, visible and ultraviolet regions of the spectrum. It is convenient for illustration to utilize visible light, and the description hereafter will proceed on that basis. As shown, the light from a laser 20 is projected along a beam path 21 through a series of components to a record strip 22. Strip or film 22 is pulled at a nominally constant speed from a supply reel 23 over an idler wheel 24 and is supplied to a takeup reel 25 by a capstan 26 operating against a pressure roller 27 and driven by a drive system 28. Takeup reel 25 is driven in the usual manner of a tape recorder or movie projector to accept strip 22 as it is fed thereto under the control of capstan 26.

Disposed on path 21 beyond laser 20 is a light modulator 29 for intensity-modulating the light passing therethrough. Particularly suitable forms of light modulator are those of the light-sound interaction type discussed fully in the aforesaid Korpel application and in several other applications referred to therein. Generally speaking, a beam of laser light is modulated with intelligence information by propagating sound waves, representative of the modulation, across the light path at an angle appropriate to cause diffraction of the light by the sound wave fronts. In this manner, the diffracted light is modulated in intensity in accordance with the video signals modulating the sound waves. In one such approach, the light beam is very narrow. In another, intensity variations between successive groups of the sound waves represent different elements of the video picture and a plurality of such groups simultaneously intercept the light beam. Downstream of those sound waves is another, preferably similar, element for guiding across the light beam acoustic waves that interact with the light to diffract the beam at an angular rate correlated with the propagation velocity of the sound waves of the modulator. This element is embodied herein as an acoustic light deflector 31 which is to be further described. The system also includes demagnifying optics 32 that image the intensity variations in the modulator upon the plane of strip 22 where the image is to be recorded.

Using this light-sound interaction approach, the sound waves in modulator 29 typically are modulated with a high frequency carrier upon which the video information in turn has been modulated. That high frequency carrier, for example, may have a frequency of 40 megahertz and the sound waves are generated by a piezoelectric transducer in acoustical contact with a body of water through which the sound waves are propagated in their traversal of the light beam. To the end, then, of driving modulator 29, driving signals are fed thereto from a video modulator 33. The latter constitutes a source of the high frequency signals upon which video signals derived from a video source 34 are modulated.

As indicated, deflector 31 similarly utilizes diffractive interaction between acoustic waves and the light beam, preferably at the Bragg angle as also fully discussed in the Korpel application. The angle by which the light is diffracted is proportional to the frequency of the sound waves, and, by repetitively scanning the sound frequency through a range of frequencies, the light beam similarly is caused to scan back and forth in the plane of diffraction. Thus, deflector 31 may simply be composed of a container enclosing a medium such as water in which the acoustic waves are caused to propagate by a transducer. While the latter may be simply a flat piezoelectric crystal, the aforesaid Korpel case refers to more complex transducer structures which enable an increased range of scan, and which therefore are preferred.

As also explained in the Korpel application, the sound beam launched by the transducer in deflector 31 preferably is comparatively wide in the direction of light travel and of relatively narrow height in the direction perpendicular to the direction of horizontal deflection. Consequently, for efficient deflection, it is desired that the light beam entering deflector 31 also be of narrow height but wide in the direction of sound propagation. To that end, the deflector arrangement preferably includes a cylinder lens disposed in the path of light ahead of deflector 31 so as to focus the beam to a wedge-shaped crossover within the sound path in the deflector. A corresponding cylinder lens acts upon the beam emerging from deflector 31 to restore the beam to a circular cross section.

Video source 34 is simply a conventional television receiver capable of receiving broadcast radiofrequency composite television signals and provided with a signal takeoff, for example at the second detector, to enable the feed of the received composite television signals, including both picture signals and synchronizing signals, to modulator 33. The carrier, upon which the video signals thus are modulated, is fed to modulator 29 and there impressed upon the beam from laser 20 in the form of intensity modulation of the light.

At the same time, deflector 31 is driven by a synchronizing signal modulator 35 which in turn is under the control of a control system 36 that responds to synchronizing signals from source 34. That is, modulator 35 constitutes a source of high frequency carrier signal which in turn is frequency modulated repetitively in a cycle that is timed or controlled by means of the horizontal scanning signal from source 34 so as to be repeatedly scanned over the frequency range required to achieve horizontal scansions of the light beam across strip 22 with desired trace and retrace intervals.

With the beam thus modulated with video signals from modulator 29 and deflected by deflector 31 at the horizontal scanning rate corresponding to those video signals, the beam as seen in an imaginary image plane across path 21 just beyond deflector 31 would constitute in each trace of its scan cycle one image line of a television-type display of the video picture. The modulated and only horizontally deflected beam, after emerging from deflector 31, is focused by optics 32 upon the film plane defined by strip 22 where it forms a very small image of each horizontal scan. The optics in this instance simply take the form of a projection lens focused upon the plane defined by strip 22.

Consequently, an extremely small picture or image of a video line is defined on strip 22, and the available brightness or light flux per unit area on the strip is enormous. With motion of strip 22 so that the horizontal lines appear on the film successively one after the next, a complete image raster is defined upon the strip. Several examples of the small size such a complete raster may occupy are set forth in the aforesaid Korpel application. In one of those examples, the width of that raster is but 0.015 inch.

As also mentioned in the Korpel application, the material of which strip 22 is formed may be of a number of different types exhibiting various responses to the incident light. A principal approach is the use of photographic film which subsequently is developed and fixed to retain the image defined thereon as a result of the scanning by the light beam and the movement of the film during recording.

In the conventional television transmission system utilized in the United States, the horizontal scanning lines are interlaced in the vertical direction so that alternative halves of a total picture frame are produced in successive fields. That is, two successive complete fields must be recorded on strip 22 in order to define one complete picture frame or total image. The next two successive fields developed upon strip 22 represent the following picture frame. It is a general function of control system 36 to operate drive system 28 so that capstan 26 runs at a speed effecting movement of strip 22 such that the succession of scanned horizontal lines properly defined the image raster. As will be discussed more fully below, the recorded video information preferably includes not only the actual picture content but also one or more of the horizontal signals at the start of each line, the vertical synchronization signals at the start of each field, and, in the case of color, the color burst signals.

Once the succession of images have been recorded upon strip 22, the system of FIG. 1 also permits the display of the recorded video information by the use of a video reproducer 37. To this end, a photosensitive detector 38 is disposed to focus generally upon and receive a portion of the light reduced from strip 22. As shown, detector 38 receives light reflected from strip 22. Alternatively, the detector may be disposed to receive the light transmitted through the image region of the strip.

Detector 38 responds to the reduced radiation to develop an electrical signal which instantaneously is representative of the light being reflected from the position of the light beam on strip 22. Consequently, that electric signal represents the recorded video information, including both picture and synchronizing information, and it is this signal which is fed to reproducer 37.

The reproducer in this instance is again a conventional television receiver which utilizes the video picture information in the incoming signals to feed an intensity control element of the picture tube. Also conventionally, as such, the synchronizing signals fed from detector 38 are employed to govern the action of the systems in reproducer 37 for controlling the scansion of the electron beam in the picture tube. As disclosed in the Korpel application, video source 34 and video reproducer 37 may be in large part combined so as to take the form of a single television receiver with a suitable switching network to allow it to function either as a reproducer in response to the signals from detector 38 or as the source of video signals fed to modulator 33. It should be noted that the laser beam, when recording on strip 22, preferably is relatively broad so that a plurality or group of sound waves simultaneously intercept the beam in modulator 29. On playback, however, the beam should be narrow to represent a single picture element as discussed fully in the Korpel application.

In the playback mode of operation, video modulator 33 is in effect disabled so that modulator 29 is inactive and the light from laser 20 passes through that modulator to deflector 31. For most faithful playback, it is essential that a correct relationship be maintained between the horizontal scanning action and the vertical film motion. In a first approach to achieving that end, the film speed during recording is controlled so that the adjacent recorded horizontal lines just fuse together.

Figure 2:
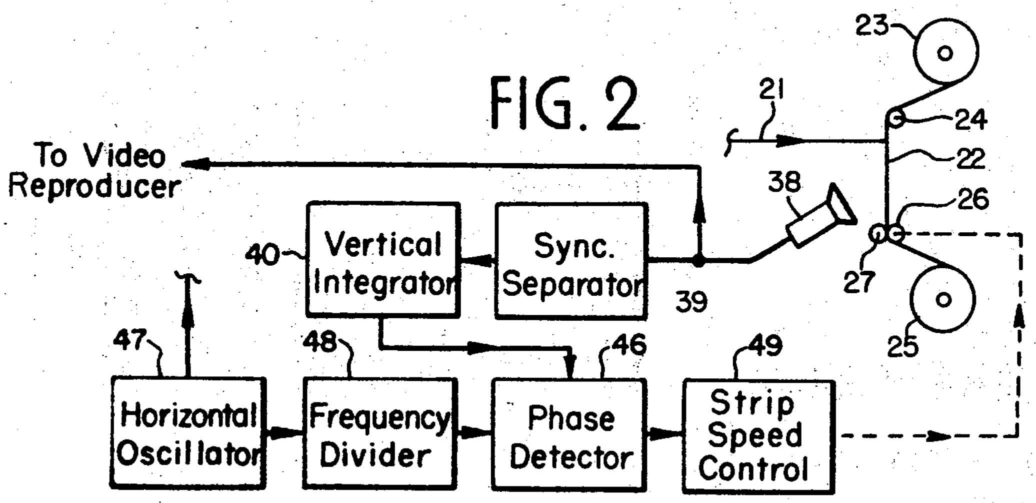
FIG. 2 is a diagram of a portion of the system of FIG. 1 utilized during playback of recorded information.

For use, then, on subsequent playback, FIG. 2 depicts an addition to be made to the system of FIG. 1 in order to correlate accurately the strip speed with the rate of horizontal scan and thus avoid production by video reproducer 37 of an image having beats or line crawl. The system as thus augmented takes advantage of the vertical synchronizing pulses recorded on strip 22 at the end of each image field. Those pulses appear in the output of detector 38 and are separated out by a conventional synchronizing-signal separator 39, integrated in a vertical-synchronizing-signal integrator 40 and then fed to a phase detector 46. A separate line from detector 38 carries the composite video information to reproducer 37.

A stable horizontal oscillator 47 that may be included in control system 36 (FIG. 1) develops the horizontal scanning signals applied to modulator 35 which in turn drives deflector 31. Oscillator 47 may include a piezoelectric crystal to maintain a constant frequency of the horizontal scanning signals. Those scanning signals are divided down in frequency by a divider 48 so as to be nominally of the same frequency as the vertical synchronization pulse information derived from film strip 22 by detector 38. The signals from the latter are compared in phase detector 46 with the divided-down signals from divider 48 to produce an error signal which is utilized to adjust a speed control 49 which may be included in drive system 28 of FIG. 1 and hence adjust the speed of strip 22 to maintain constant the desired relationship between strip speed and the horizontal scanning action. Consequently, the vertical film speed is so adjusted that the number of horizontal scans per field is precisely that desired. In accordance with conventional U.S. television standards, the number of such horizontal scans is 525 per complete frame composed of two successive fields. It will be observed that a specific phase relationship in this case is not necessary between the film motion and the horizontal scan, although if the fusing of the recorded lines is not perfect it may be advantageous to maintain that standard relationship at least approximately. It may also be noted that, alternatively to using the vertical synchronizing signals derived from sync separator 39 and integrator 40, vertical synchronizing information may be derived from reproducer 37. For example, relatively high-voltage signals obtainable at the vertical-deflector yoke coils may, if desired, constitute this input to detector 46.

Figure 3:
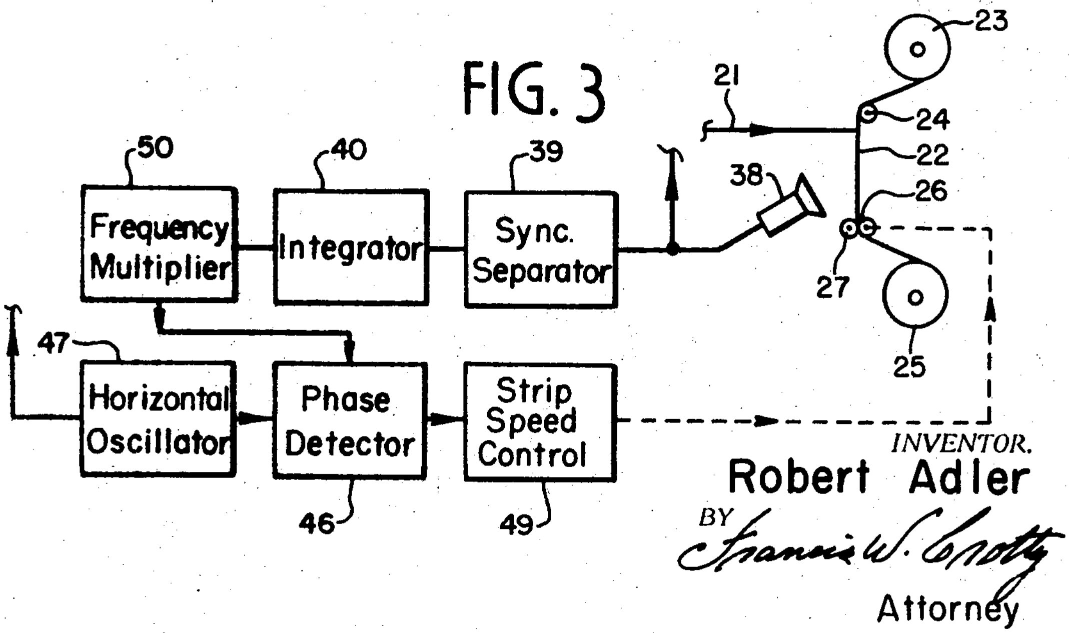
FIGS. 3, 4, and 5 are respective different embodiments alternative to that of FIG. 2.

FIG. 3 shows an alternative to FIG. 2 32 wherein, instead of dividing down the horizontal scanning signal frequency for the purpose of phase comparison, the vertical synchronizing pulse information derived by detector 38 is selected by separator 39, acted on by integrator 40 and multiplied in a frequency multiplier 50 so as to have a value nominally the same as that of the signals produced by oscillator 47. Otherwise, the system operates the same as that of FIG. 2 with detector 46 functioning to develop an error signal whenever the film speed departs from that which is necessary to obtain on playback the proper number of horizontal scans for a complete image raster, and that error signal is in the same way used to adjust the film speed upon such departure in order to reduce the error signal to zero.

Figures 4, 5, 6:
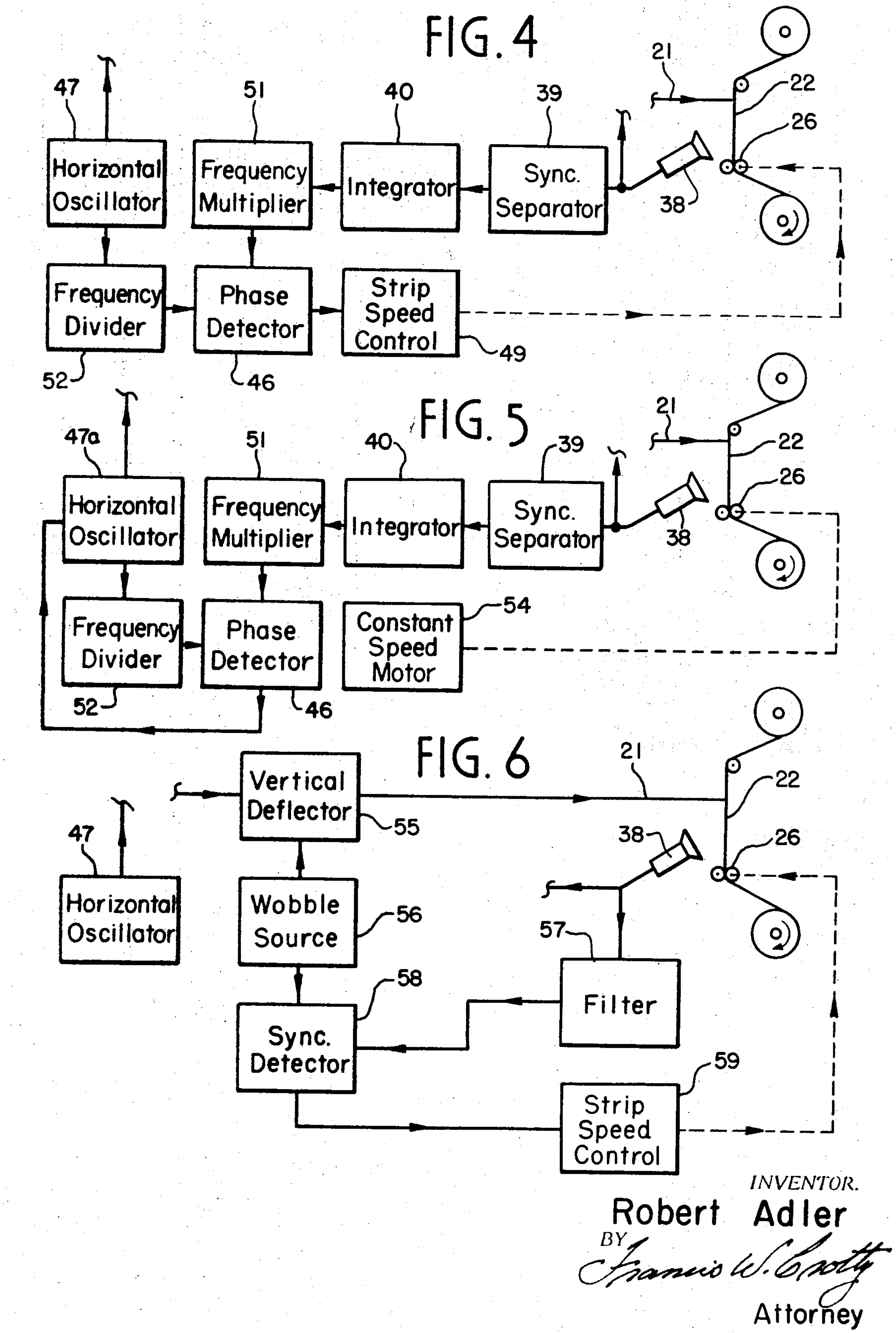
FIG. 6 is a diagram of a portion of FIG. 1 modified to include a different synchronization system.

In order more readily to obtain fast response in such systems while avoiding the use of a large number of multiplying or dividing circuits, the system of FIG. 4 represents a compromise wherein the vertical synchronizing information derived from detector 38 by separator 39 and processed by integrator 40 is multiplied to an intermediate frequency by a multiplier 51. At the same time, the scanning signal sampled from oscillator 47 is divided to that same nominal intermediate frequency by divider 52. The signals from multiplier 51 and divider 52 are compared in detector 46 again to develop the error signal used to adjust the speed of strip 22 in order to maintain the correct relationship between the horizontal scanning action and the vertical film motion. As an example for the playback of recorded conventional television signals, multiplier 51 is assigned a factor of 7 to multiply the field rate of 60 hertz up to 420 hertz. At the same time, the double horizontal rate of signals produced by oscillator 47 (in the standard interlaced system) is divided by the factor 75 to obtain the same nominal frequency of 420 hertz.

FIG. 5 illustrates a modification of the system of FIG. 4 wherein strip 22 is driven by a constant speed motor 54 and the error signal developed by phase detector 46 is used to vary the frequency of the signals developed by oscillator 47*a* so as to maintain constant the correct relationship between the horizontal scanning action and the vertical film motion. Oscillator 47*a* thus forms part of an automatic phase control loop, which in itself resembles the conventional horizontal scan control circuit in television receivers. Thus, the system of FIG. 5 operates like that of FIG. 4 except that it is the horizontal deflection rate which is controlled in order to maintain the desired accurate relationship to the speed of movement of strip 22. Moreover, this approach, of controlling the speed of the horizontal deflection instead of the speed of movement of strip 22, may similarly be used in the systems of each of FIGS. 2 and 3.

Generally speaking, recording in a manner in which the information lines on the film strip are caused to fuse results in some reduction in resolution. While this is permissible in the case of the recording of monochrome images or of images representing the information with respect to a single color or a single component of a color picture, such as a color difference signal, the approach leaves something to be desired when it is attempted to record an entire composite color television video signal directly in a single image upon strip 22. Consequently, it may be come desirable to separate the recorded horizontal information lines cleanly from one another. This occurs when the speed of strip 22 is slightly higher than in the above-discussed case in which the recorded lines are caused to fuse. With such separation between the recorded lines to permit full resolution and particularly when the recording is of a standard complete color video signal, it additionally is necessary that during playback the scanning beam always rides along the center of each recorded line. That necessity involves not only obtaining the correct relationship between strip speed and horizontal scan rate but additionally necessitates accurate phase alinement The modification illustrated in FIG. 6 attains that added benefit.

As shown in FIG. 6, beam 21 on playback traverses a vertical deflector 55 driven by a source 56 of wobble-frequency signal. Deflector 55 may be a mechanical system such as a tilting mirror driven by a piezoelectric element, an electro-optical system using the Kerr or Pockels effect, or a light-sound interaction system similar to that of deflector 31 in FIG. 1. The action of deflector 55 is to wobble or tilt beam 21 vertically at a frequency substantially higher than any signal frequency in the recorded video information. The amplitude of the wobble preferably is such that beam 21 is moved vertically less than the distance separating two successive ones of the recorded horizontal lines.

In operation, the imposition on the beam of the wobbling movement causes detector 38 to yield an output signal from which a filter 57 selective of the wobble frequency extracts a corresponding high frequency component or tilting signal. That component selected by filter 57 is fed to a synchronous detector 58 to the other input of which is applied a sample of the wobble signal from source 56. Detector 58 produces an error signal which is then fed to a speed control 59 for adjusting the speed of movement of strip 22. The nature of the signal from detector 38 depends on the alinement of the beam with the horizontal lines; the error signal is proportional to the departure from perfect alinement and has a polarity dependent on the difference in phase between the two input signals to detector 58. The polarity of this phase difference depends in turn on whether the lines recorded on the moving strip lap or lead the scanning beam. Consequently, the strip speed is so controlled that the scanning beam rides along the center of each recorded line.

Figure 7:
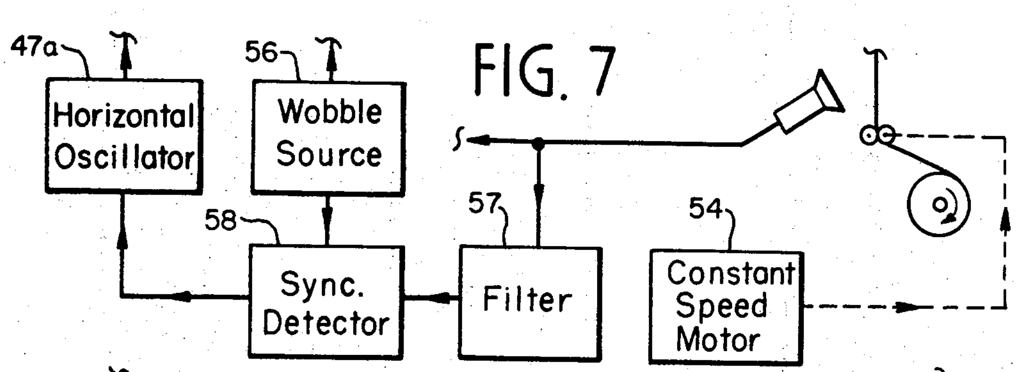
FIG. 7 is a diagram of an embodiment alternative to that of FIG. 6.

Since the frequency of oscillator 47 may be closely controlled, by use of a piezoelectric crystal or similar frequency standard, and thus the horizontal scanning or deflection speed is subject to being held to a constant rate, it generally is preferred to utilize the error signal developed by detector 58 to control the speed of strip 22. However, as in the case of FIG. 5, it is plausible in the alternative to control the horizontal deflection speed by feeding the error signal from detector 58 to horizontal oscillator 47*a* as shown in FIG. 7, while employing constant speed motor 54 to drive strip 22. Otherwise, the system of FIG. 7 operates in a manner the same as that in FIG. 6 so as to maintain the correct relationship between the horizontal scanning motion and the vertical film motion and to ensure that the scanning beam rides along the center of each recorded line.

Figure 8:
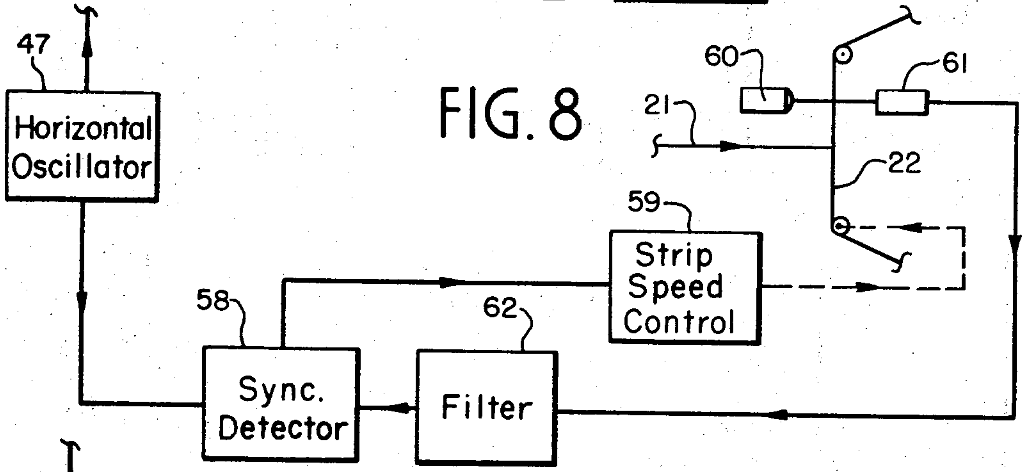
FIG. 8 is a diagram of a still different system that may be utilized in the system of FIG. 1 for control of the operation of the latter.

In the system of FIG. 8, a separate source 60 directs a beam of light through strip 22 to a photodetector 61 in order to develop in the latter a periodic signal at the horizontal scanning frequency. To that end, the beam from source 60 preferably is directed through that side of strip 12 where the horizontal synchronizing pulses are recorded. The signal from photodetector 61 is fed through a filter 62 selective of that horizontal synchronizing pulse component and then applied to one input of synchronous detector 58. A sample of the scanning signal developed by oscillator 47 is fed to the other input of synchronous detector 58. Consequently, the action of detector 58 is to compare in phase the actual horizontal scanning signal developed by oscillator 47 and a signal, nominally of the same frequency, as recorded upon and thereby associated with strip 22. Any phase difference between the two signals appears as an error signal from synchronous detector 58 which is fed to strip-speed control network 59 in order to change the speed of the strip movement in the direction necessary to remove the error.

Figure 9:
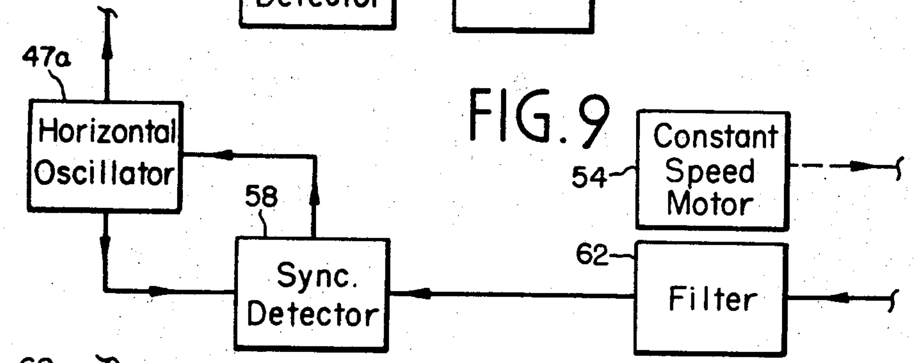
FIG. 9 is a diagram of an embodiment alternative to that of FIG. 8.

Like the difference between FIGS. 6 and 7, the system of FIG. 9 may be used as an alternative to that of FIG. 8 in order to control the speed of horizontal deflection instead of the speed of strip movement. Thus, in FIG. 9 constant speed motor 54 is employed to drive strip 22, and the output of synchronous detector 58 is fed to horizontal oscillator 47*a* so as to adjust the phase of the latter as necessary to maintain a constant phase relationship between the horizontal scanning motion and the vertical strip motion.

While the apparatus utilized for purposes of playback may be completely different from that employed for recording video information upon strip 22, the overall system of FIG. 1, wherein the same light beam, optics and deflection elements are employed for both, is advantageous in that width and linearity of the horizontal scanning action tend to be the same for both recording and playback. However, when the system of FIG. 1 is utilized to record directly in one image raster a complete composite color video signal, changes in horizontal line width may result in color shift, especially toward the right side of the picture. The tolerance on scan width is comparatively small and may even be exceeded by mechanical distortions of strip 22 under the influence of temperature or stress. To the end of overcoming such difficulties, the system of FIG. 10 may be employed as an adaption to that of FIG. 1 in order to maintain constant the scanning width.

Figure 10:
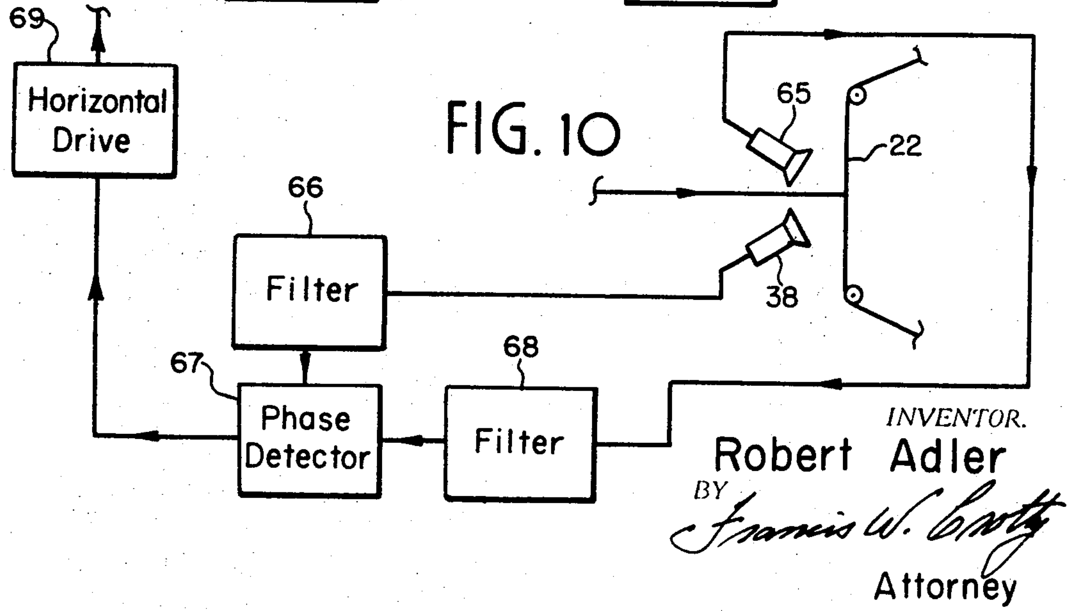
FIG. 10 is a diagram of an embodiment of a still different system useful in the arrangement of FIG. 1 for control of the operation of the latter.

The system of FIG. 10 takes advantage of the use in the overall FIG. 1 system of acoustic light deflector 31. With that light-sound interaction approach, during the horizontal retrace period on either record or playback, the beam from laser 20 is split. This will be understood from a consideration of the frequency changes of the signal applied to deflector 31.

During trace periods, which are very long compared to retrace, the frequency changes linearly at a relatively slow rate between two extreme values chosen to provide a desired width for the horizontal scan line. At retrace, however, the frequency changes in an opposite sense between these same two extremes but at a very rapid rate, ideally at an infinite rate. Accordingly, the retrace period represents an exceedingly short and sharp discontinuity in the rate of frequency change although a change of the same total amount occurs in trace intervals. This is manifest in the sound cell of deflector 31 in the form of a corresponding discontinuity which then requires a certain transit time to traverse the cell. The wavefront at the leading edge of this discontinuity causes the diffracted beam that has been scanning one line of film 22 to conclude that line scan and the beam decreases in intensity as that line scansion concludes. The wavefront at the trailing edge of this discontinuity establishes a second diffracted beam which impinges upon film strip 22 exactly one line width from the instantaneous position of the first beam since the frequencies of the acoustic signals involved are separated by just the spacing employed for deflecting a beam across the strip during line trace. The two beams travel synchronously, with the second increasing in intensity as the first decreases in intensity. When the discontinuity has passed through the cell aperture, the condition of a single beam is restored and scanning of the next succeeding line on strip 22 continues.

Thus, one part of the beam is directed to the extreme left side of strip 22 while the other is directed to the extreme right side of the strip during the retrace period. Both the horizontal synchronizing pulses and the color bursts, which occur during that period, are recorded at both ends of the recorded horizontal lines of picture information. Consequently, two separate locations on strip 22, on opposite sides carry identical information and these are separated by a distance precisely corresponding to the period of one horizontal line.

Taking advantage of the aforesaid double recording of identical information at different locations, in the system of FIG. 10 detector 38 is positioned to pick up the light reflected from strip 22 not only from the portion of the horizontal lines carrying the picture information but also the additional information at one end of the line representing the horizontal synchronizing pulses, and in the case of color, the color burst signal. At the same time, a separate photocell 65 is located to respond to the second beam which is present during retrace periods of playback and pick up from strip 22 the light of beam 21 reflected from the opposite ends of the horizontal lines, where the other recording of the horizontal synchronizing pulse and color burst information has occurred.

The one signal from detector 38 is fed through a filter 66 to a phase detector 67, filter 66 being selective of either or both of the horizontal sync pulse information and the color burst information. Similarly, the other signal from photocell 65 is fed to phase detector 67 through a filter 68, also selective of the horizontal synchronizing pulse information or of the color burst information or both. Detector 67 compares the signals respectively from the two filters and produces an error signal which then is applied to a horizontal drive network 69 that adjusts the amplitude of horizontal deflection and hence the scan width in the direction necessary to reduce the error signal from detector 67. That is, detector 67 compares either the timing of the two horizontal synchronizing pulses as derived from the opposite ends of the recorded horizontal scanning lines or it compares the timing of two similarly displaced color burst signals. When using acoustic light deflector 31 of FIG. 1, it is the function of horizontal drive network 69 to control a range of frequency sweep in synchronizing signal modulator 35 since the amplitude of light deflection is proportional to the change in frequency of the signal driving light deflector 31. That is, horizontal drive network 69 in the illustrated arrangement controls the frequency deviation of the signal applied to light deflector 31.

There have thus been described several approaches highly useful in obtaining accurate synchronization and control in a recorded video playback system of a kind which features comparatively high-resolution recording and reproduction while yet requiring but a small amount of record medium for a given length of recorded program material. the various systems discussed permit the maintenance of a precise relationship between the horizontal scanning action and the vertical movement of the recording strip. Further developments of this system enable maximum resolution capability while achieving correct relative phase so as to avoid unwanted effects in the reproduced image. Yet, and in spite of the high degree of precision obtainable, the systems disclosed employ comparatively few stages which individually may be of a now-conventional nature.

I claim:

1. In a recording system in which a strip moving vertically has recorded thereon a succession of radiation-responsing horizontal lines each representing a scansion of video information including picture and line as well as field synchronizing signals, a synchronizing system comprising:

means for developing a collimated beam of coherent optical radiation;

means for developing a deflection signal having a frequency different from that of said field synchronizing signals and responsive thereto for effecting repetitive horizontal deflection of said beam at a rate corresponding to the frequency of said deflection signal and for focusing said beam upon said strip;

a detector disposed to receive a portion of said radiation reduced from said strip during said deflection and develop a control signal having a frequency proportional to that of said field synchronizing signals;

means for deriving from said deflection signal a comparison signal having a predetermined nominal frequency relation to said control signal;

means for comparing said control signal with said comparison signal to develop an error signal; and control means responsive to said error signal to adjust the relation between the speed of movement of said strip and the rate of deflection of said beam.

2. A system as defined in claim 1 in which said means for deriving said comparison signal includes means for dividing the frequency of said deflection signal to develop a comparison signal having a frequency nominally the same as said control signal; and in which said comparing means comprises a phase detector for comparing said comparison signal and said control signal to develop said error signal.

3. A system as defined in claim 1 in which said means for deriving said comparison signal includes means for multiplying the frequency of said control signal to develop a comparison signal having a frequency nominally the same as said deflection signal; and in which said comparing means comprises a phase detector for comparing said deflection signal and said comparison signal to develop said error signal.

4. A system as defined in claim 1 in which said means for deriving said comparison signal includes means for dividing the frequency of said deflection signal to develop a first comparison signal having a frequency nominally of a predetermined value;

in which the system further includes means for multiplying the frequency of said control signal for developing a second comparison signal having a frequency nominally of said predetermined value; and and in which said comparing means comprises a phase detector for comparing said first and second comparison signals to develop said error signal.

5. A system as defined in claim 1 in which said deflection signal is of substantially constant frequency and said control means varies the speed of strip movement in response to said error signal.

6. A system as defined in claim 1 in which said strip movement is substantially constant and said control means varies the frequency of said deflection signal in response to said error signal.

7. In a recording system in which a strip moving vertically has recorded thereon a succession of radiation-responding horizontal lines each representing a scansion of video information, a synchronizing system comprising:

means for developing a collimated beam of coherent optical radiation;

means for developing a deflection signal and responsive thereto for effecting repetitive horizontal deflection of said beam at a rate proportional to the frequency of said deflection signal and for focusing said beam upon said strip;

wobble means for developing a tilting signal and responsive thereto for effecting repetitive tilting of said beam vertically during said horizontal deflection by an amount not exceeding the separation of successive horizontal lines on said strip;

a detector disposed to receive a portion of said radiation reduced from said strip during said deflection and develop a control signal dependent upon alinement of said beam with said horizontal lines;

means for comparing said tilting signal and said control signal to develop an error signal proportional to the departure from a desired condition of said alinement and of a polarity depending upon the difference in phase between said tilting and control signals; and control means responsive to said error signal to control the speed of movement of said strip relative to the rate of deflection of said beam.

8. A system as defined in claim 7 in which the frequency of said tilting signal is higher than the frequencies of said video information.

9. A system as defined in claim 7 which further includes a filter selective of said tilting signal and coupled between said detector and said comparing means.

10. A system as defined in claim 7 in which said wobble means includes a source of said tilting signal and said comparing means includes a synchronous detector coupled to said source and to said detector.

11. In a recording system in which a strip moving vertically has recorded thereon a succession of radiation-responding horizontal lines each representing a scansion of video information including picture signals and with synchronizing signals at the end of one line and at the beginning of the next line having been recorded simultaneously, a synchronizing system comprising:

means for developing a collimated beam of coherent optical radiation;

means for developing a deflection signal;

means responsive to said deflection signal for effecting repetitive horizontal deflection of said beam across said strip at a rate proportional to the frequency of said deflection signal and for splitting said beam into two partial beams separated by the width of one scanning line during the initial and final portions of the scanning motion;

a first detector disposed to receive a portion of said radiation reduced from said strip during said deflection and develop a first control signal proportional to the synchronizing signals at one end of said lines;

a second detector disposed to receive a portion of said radiation reduced from said strip during said deflection and develop a second control signal proportional to the synchronizing signals at the other end of said lines;

means for comparing said control signals to develop an error signal proportional to differences in time, from one end to the other of said lines, between said synchronizing signals; and control means responsive to said error signal for varying the width of said scanning lines.

12. A system as defined in claim 11 which further includes a first filter selective of said synchronizing signals coupled between said first detector and said comparison means and a second filter selective of said synchronizing signals coupled between said second detector and said comparison means.

13. A system as defined in claim 11 in which said comparing means includes a phase detector coupled to said first and second detectors.

14. A system as defined in claim 11 in which said deflection is accomplished by Bragg diffraction through a wave of high frequency sound and said control means varies the amount of frequency deviation of said deflection signals.